US007308616B2

(12) United States Patent
Gollub et al.

(10) Patent No.: US 7,308,616 B2
(45) Date of Patent: Dec. 11, 2007

(54) METHOD, APPARATUS, AND COMPUTER PROGRAM PRODUCT FOR ENHANCED DIAGNOSTIC TEST ERROR REPORTING UTILIZING FAULT ISOLATION REGISTERS

(75) Inventors: Marc Avery Gollub, Round Rock, TX (US); Chuon Wei Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/926,583

(22) Filed: Aug. 26, 2004

(65) Prior Publication Data

US 2006/0048005 A1    Mar. 2, 2006

(51) Int. Cl.
  *G06F 11/00* (2006.01)
(52) U.S. Cl. ...................................................... 714/48
(58) Field of Classification Search ................. 714/48, 714/46, 723
  See application file for complete search history.

(56) References Cited

U.S. PATENT DOCUMENTS

| | | | | |
|---|---|---|---|---|
| 4,167,041 A | * | 9/1979 | Curlander et al. ............ 714/48 |
| 4,764,926 A | * | 8/1988 | Knight et al. ................ 714/733 |
| 4,995,039 A | * | 2/1991 | Sakashita et al. ........... 714/731 |
| 5,189,675 A | * | 2/1993 | Nozuyama et al. .......... 714/726 |
| 5,252,917 A | * | 10/1993 | Kadowaki .................... 714/731 |
| 5,517,108 A | * | 5/1996 | Kadowaki ................. 324/158.1 |
| 5,588,006 A | * | 12/1996 | Nozuyama ................... 714/703 |
| 5,617,429 A | * | 4/1997 | Goto ........................... 714/736 |
| 5,654,972 A | * | 8/1997 | Kuroiwa et al. ............. 714/724 |
| 6,308,289 B1 | * | 10/2001 | Ahrens et al. ................. 714/48 |
| 6,314,536 B1 | * | 11/2001 | Kurosaki ..................... 714/718 |
| 6,324,614 B1 | * | 11/2001 | Whetsel ....................... 714/726 |
| 6,430,718 B1 | * | 8/2002 | Nayak .......................... 714/727 |
| 2004/0154001 A1 | * | 8/2004 | Haghighat et al. .......... 717/130 |
| 2006/0156094 A1 | * | 7/2006 | Chen ............................ 714/723 |

* cited by examiner

*Primary Examiner*—Robert W Beausoliel
*Assistant Examiner*—Amine Riad
(74) *Attorney, Agent, or Firm*—Duke W. Yee; Diana R. Gerhardt; Lisa L. B. Yociss

(57) ABSTRACT

A method, apparatus, and computer program product are disclosed for enhancing the error reporting that is done utilizing fault isolation registers (FIRs) after executing a diagnostic test. A diagnostic test is generated that will test for a particular type of error. A particular FIR is designated to be used to report the particular type of error. The particular FIR is designated in the design of the particular diagnostic test and the design of the particular FIR. Another FIR that is not designed to be used to report the particular type of error is also selected. This other FIR is unrelated to the diagnostic test. The result of the execution of the diagnostic test is reported utilizing the particular FIR and the other, selected FIR.

6 Claims, 4 Drawing Sheets

METHOD, APPARATUS, AND COMPUTER PROGRAM PRODUCT FOR ENHANCED DIAGNOSTIC TEST ERROR REPORTING UTILIZING FAULT ISOLATION REGISTERS

BACKGROUND OF THE INVENTION

1. Technical Field

The present invention is directed to data processing systems. More specifically, the present invention is directed to a method, apparatus, and computer program product for enhancing the error reporting that is done utilizing fault isolation registers (FIRS) after executing a diagnostic test.

2. Description of Related Art

Diagnostic testing is typically done in a data processing system during the Initial Program Load (IPL) stage. Typically, diagnostic tests are executed utilizing the main memory store as well as the various caches. In addition, diagnostic tests may also be performed on individual integrated circuits and/or functional units included in the integrated circuits in the data processing system.

Fault Isolation Registers (FIRs) are included in the system and are designed to indicate the results of particular diagnostic tests. Each FIR includes multiple bits that are designed to indicate the various results of particular tests. When a particular test is designed, particular FIRs and particular bits in those FIRs are selected to indicate the results of the test. Thus, according to the design of the test and the design of the FIRS, a particular fault will be indicated utilizing a pre-specified one or more bits in one or more pre-specified FIRS.

After a diagnostic test is run, a routine that evaluates the results of the test can be run that will check the results reported by the bits within the FIRs that were pre-selected to report results from this test. One problem with the prior art approach is that there may be occasions when an unrelated FIR that had not been pre-selected to report a fault in response to a particular diagnostic test is affected by the execution of the particular test. These unrelated FIRs are not related to the particular diagnostic test. These unrelated FIRs were not preselected to report the results of this test. The routine that evaluates the results of this particular test will not check this unrelated FIR because this unrelated FIR is not designed and pre-selected to report faults for this test. Thus, the potential to diagnose and correct this fault may be lost.

Therefore, a need exists for a method, apparatus, and computer program product for enhancing the error reporting that is done utilizing fault isolation registers (FIRs) after executing a diagnostic test.

SUMMARY OF THE INVENTION

A method, apparatus, and computer program product are disclosed for enhancing the error reporting that is done utilizing fault isolation registers (FIRS) after executing a diagnostic test. A diagnostic test is generated that will test for a particular type of error. A particular FIR is designated to report the particular type of error after the execution of the test. The particular FIR is designated in the design of the particular diagnostic test and the design of the particular FIR as being related to the test and is designated in the design as reporting errors resulting from the test. Another FIR, that is not designed to be used to report the particular type of error, is also selected. This other FIR is unrelated to the diagnostic test. The result of the execution of the diagnostic test is reported utilizing the particular FIR and the selected unrelated FIR.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
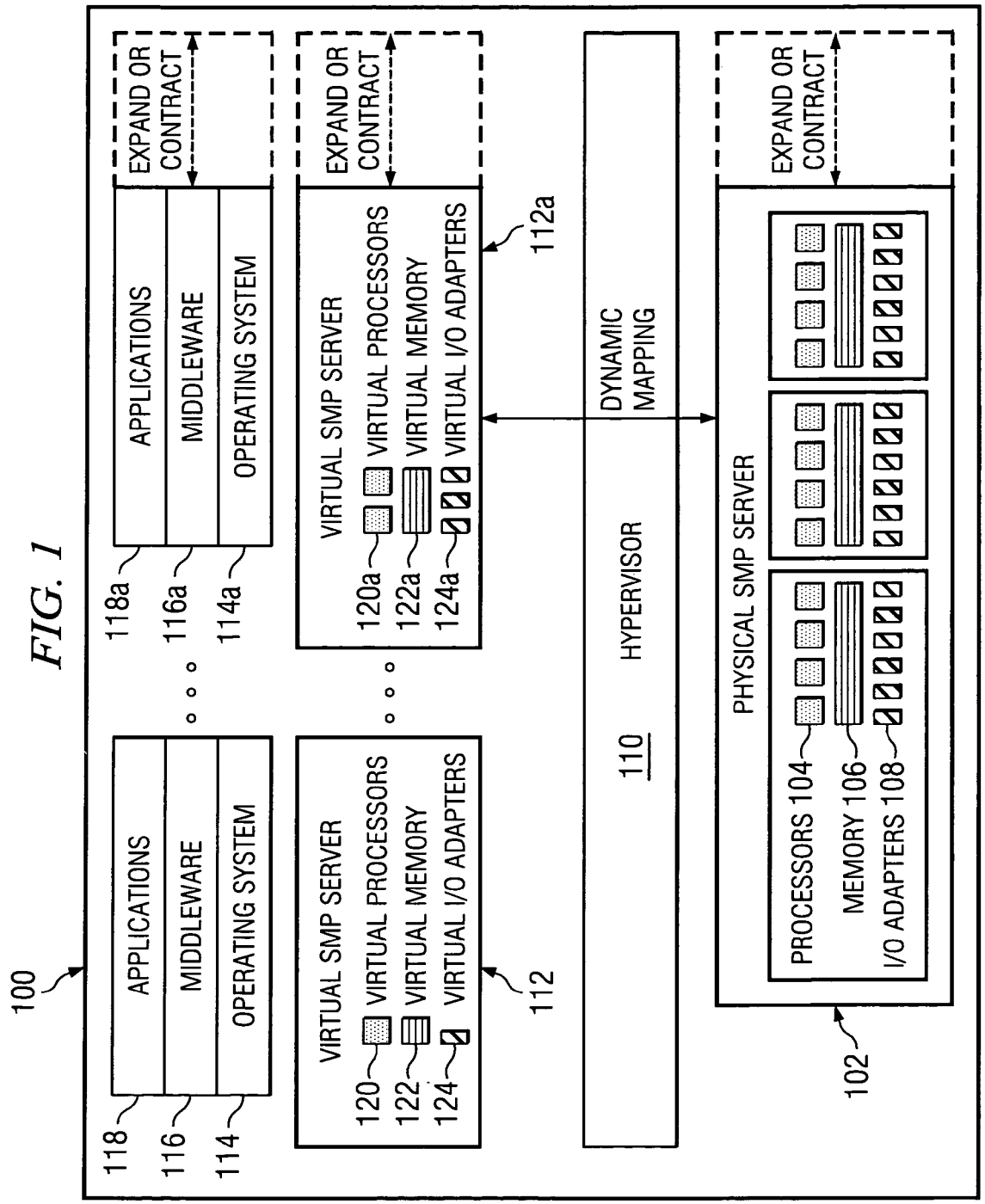
FIG. 1 is a block diagram of a data processing system that implements the present invention in accordance with the present invention.

A preferred embodiment of the present invention and its advantages are better understood by referring to the figures, like numerals being used for like and corresponding parts of the accompanying figures.

The present invention is a method, apparatus, and computer program product for enhancing the error reporting that is done utilizing fault isolation registers (FIRs) after executing diagnostic tests.

A particular diagnostic test is designed to report particular errors utilizing particular designated FIRs. The designation of the particular FIR to use to report a particular type of error is part of the design of the diagnostic test and the design of the designated FIR. Thus, one or more FIRs are designated to report errors after the execution of a particular diagnostic test.

These designated FIRs are checked after the execution of a particular diagnostic test. According to the present invention, other FIRs that are not designated to report errors after the execution of this diagnostic test are also checked. These other FIRs are not designed to report errors after this particular diagnostic test is executed. Thus, the designated FIRs as well as additional selected, unrelated FIRs are all used after the particular diagnostic test is executed in order to report errors.

For example, an L3 Cache Ebist diagnostic test may be run on the L3 Cache. The only error bits that are designed to be used to report errors after this test is executed are included in the Ebist FIR. Thus, according to the prior art, only the Ebist FIR will be checked to see if any errors are reported. There may also exist in the system an L3 Cache FIR. Also according to the prior art, none of the bits in the L3 Cache FIR will be used to report errors that may occur when executing the Ebist diagnostic test. None of the bits in the L3 Cache FIR should be affected by the Ebist diagnostic test, and therefore, the L3 Cache FIR would not be checked at the end of this test.

However, if after the execution of the Ebist diagnostic test the L3 Cache FIR is affected, this indicates that there is something faulty within the L3 Cache. Thus, according to the present invention, both the Ebist FIR and the L3 Cache FIR are selected and evaluated after the execution of the Ebist diagnostic test.

As another example, a particular memory test may test a memory controller. The memory controller may include a FIR for reporting faults that occur during the execution of the test on the memory controller. In addition, each memory buffer may also include a FIR. According to the prior art, only the memory controller FIR would be checked after executing the memory controller test. According to the present invention, the memory controller FIR and the FIRs in each memory buffer will be checked after the execution of the memory controller test.

Each FIR includes multiple bits. Each bit is used to report whether a particular type of error occurred after a particular test is executed. According to the present invention, a first group of bits is selected. The bits included in the first group may all be included within one single FIR or some of the bits may be located in a first FIR while others of the bits are located within a second FIR. Regardless of the physical location of the bits in the first group, each bit in the first group is designated by the design of a diagnostic test to report the results of that particular test.

The bits in the first group are the bits that are designated by the design of a diagnostic test and the design of the various FIRs to be used to report the results of the particular diagnostic test. Thus, after a particular diagnostic test is executed, the results of the test are determined by checking in the places that are designed to indicate the results of the test. Therefore, the results of the test are expected to be found in the first group of bits.

In addition to the first group of bits, a second group of one or more bits is also selected. The bits in the second group are bits in FIRs that are unrelated to the particular diagnostic test. These bits are not specified as part of the design of the selected test to be used to report any errors about the execution of the test. The bits in the second group are bits that, according to the design of the test and the various FIRs, should not be affected in any way by the execution of the particular diagnostic test. Thus, after a particular diagnostic test is executed, the results of the test are determined by, in addition to checking the expected locations, i.e., the first group of bits, also checking in some places that are not designed to indicate the results of the test. The results of the test are not expected to be found in the second group of bits. According to the present invention, both locations, the first group of bits and the second group of bits, are all checked to determine the results of the execution of a particular diagnostic test.

The bits included in the second group may all be included within one single FIR or some of the bits may be located in a third FIR while others of the bits are located within a fourth FIR. Regardless of the physical location of the bits in the second group, none of the bits in the second group are designated by the design of a diagnostic test to report the results of that particular test.

The selected bits in the first and second groups are prioritized such that the bits with the highest priority are used to report the most serious errors. Once the bits are prioritized, the prioritized list is hardcoded into the integrated circuit, the system, functional unit, or elements. When the diagnostic test is run, the diagnostic test code looks through the bits in the hardcoded priority.

FIG. 1 is a block diagram of a data processing system in which the present invention may be implemented. System 100 is preferably a symmetric multiprocessing (SMP) server computer system. SMP server computer system 100 includes physical hardware devices that can be mapped to, i.e. temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110. Each one of the processors 104 is preferably a simultaneous multithreaded (SMT) processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
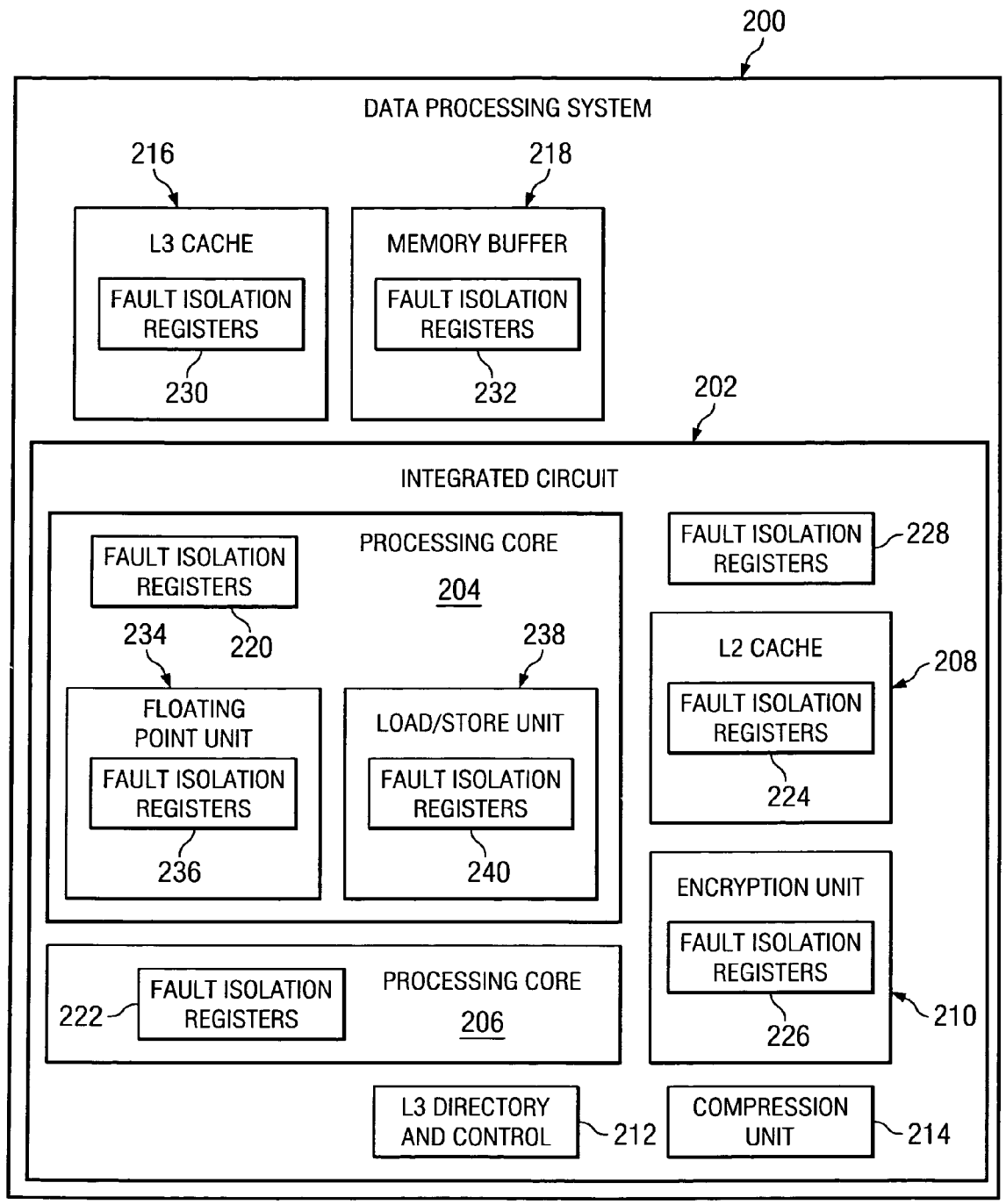
FIG. 2 is a block diagram of a data processing system that includes an integrated circuit and various fault isolation registers in accordance with the present invention.

FIG. 2 is a block diagram of a data processing system 200 that includes an integrated circuit 202 and various fault isolation registers in accordance with the present invention. Integrated circuit 202 includes various functional units, such as a Processing Core 204, a Processing Core 206, an L2 Cache 208, an Encryption Unit 210, an L3 Cache Directory and Control Unit 212, and a Compression Unit 214. Data processing system 200 also includes elements that are physically external to integrated circuit 202. For example, data processing system 200 may include an L3 Cache 216 and a Memory Buffer 218.

Each functional unit may include fault isolation registers (FIRs). For example, Processing Core 204 includes Fault Isolation Registers (FIRS) 220, Processing Core 206 includes FIRs 222, L2 Cache 208 includes FIRs 224, and Encryption Unit 210 includes FIRs 226. Integrated circuit 202 itself may include FIRs, such as FIRs 228. The elements in data processing system 200 may also include FIRs. For example, L3 Cache 216 includes FIRs 230 and Memory Buffer 218 includes FIRs 232.

Further, some of the functional units included in integrated circuit 202 may include additional functional units that may each include its own FIRs. For example, Processing Core 204 includes additional functional units such as Floating Point Unit 234 which includes its own FIRs 236. Processing Core 204 also includes Load/Store Unit 238 which includes its own FIRs 240.

Each FIR is designed to report particular types of failures that may be associated with particular hardware components. Although each FIR may vary in size, typically, each FIR is 64 bits. Each one of these 64 bits represents a particular failure type.

Diagnostic tests are designed to be run to test the various hardware. Each test is designed to test particular hardware and to report the various results of the test utilizing particular and specified bits within one or more particular and specified FIRs.

Figure 3:
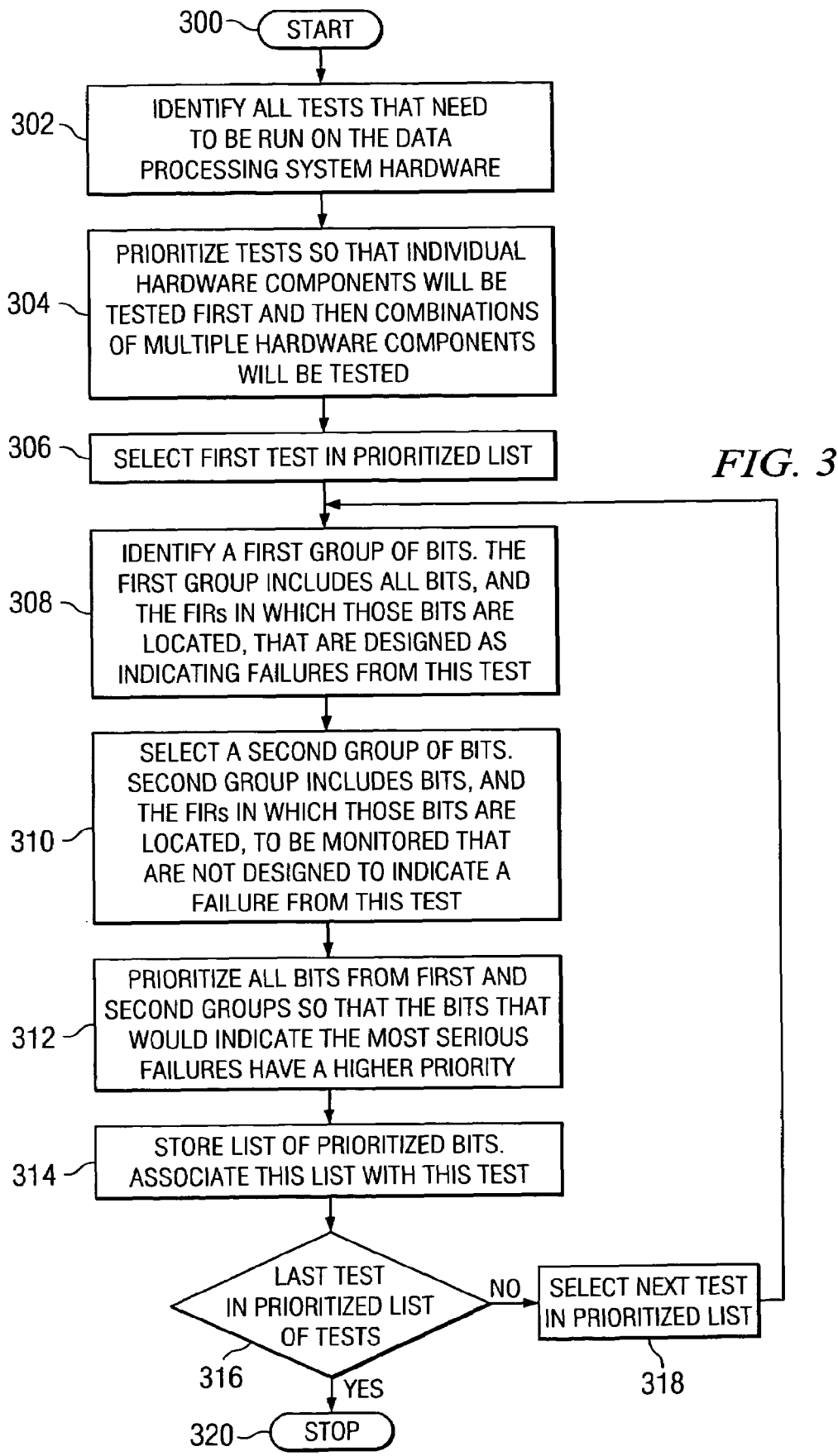
FIG. 3 depicts a high level flow chart that illustrates identifying a first group of FIR bits that are designed to indicate failures and a second group of FIR bits that are not designed to indicate failures for each of multiple different tests in accordance with the present invention.

FIG. 3 depicts a high level flow chart that illustrates identifying a first group of FIR bits that are designed to indicate failures and a second group of FIR bits that are not designed to indicate failures for each of multiple different tests in accordance with the present invention. The process starts as depicted by block 300 and thereafter passes to block 302 which illustrates identifying all diagnostic tests that need to be run on the data processing system hardware. Next, block 304 depicts prioritizing these tests so that the individual hardware components will be tested first and then combinations of multiple hardware components will be tested.

The process then passes to block 306 which illustrates selecting the first test in the prioritized list. Next, block 308 depicts identifying a first group of bits. The first group of bits includes bits that are designed to indicate a failure from the selected test. These bits are located in particular fault isolation registers. Thus, when the bits are identified, the FIRs in which the bits in this first group are located are also identified. When this particular test was designed, the bits in the first group were specified by the design of the test to be used to report the results of the test.

Thereafter, block 310 illustrates selecting a second group of bits. The second group of bits includes bits that are not designed to indicate a failure from the selected test. Again, the FIRs in which the bits in this second group are located are also identified. When the particular test was designed, the bits in the second group were not specified by the design to be used to report the results of the test.

The process then passes to block 312 which depicts prioritizing all of the bits that are included in the first and second groups so that the bits that would indicate the most serious failures have a higher priority. Any known method may be used to prioritize the bits. Next, block 314 illustrates storing this list of prioritized bits. This list is associated with this test. Block 316, then, depicts a determination of whether or not this is the last test in the prioritized list. If a determination is made that this is not the last test in the list, the process passes to block 318 which illustrates selecting the next test in the prioritized list. The process passes back to block 308. Referring again to block 316, if a determination is made that this is the last test in the prioritized list, the process terminates as illustrated by block 320.

Figure 4:
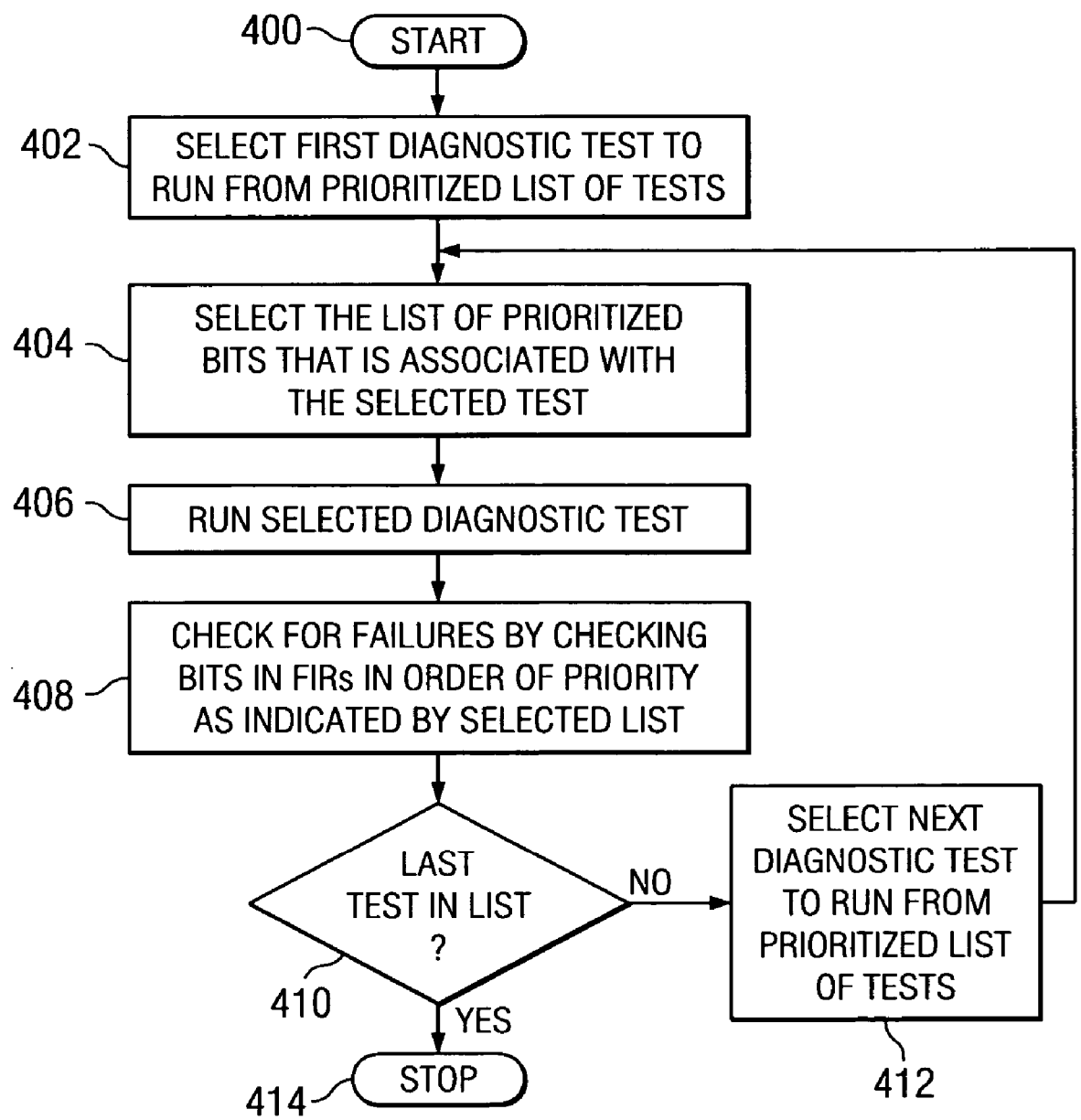
FIG. 4 illustrates a high level flow chart that depicts executing a diagnostic test and checking both the FIR bits that are designed to indicate failures from this test as well as selected FIR bits that are not designed to indicate failures from this test in accordance with the present invention.

FIG. 4 illustrates a high level flow chart that depicts executing a diagnostic test and checking the FIR bits that are designed to indicate failures from this test as well as FIR bits that are not designed to indicate failures from this test in accordance with the present invention. The process starts as depicted by block 400 and thereafter passes to block 402 which illustrates selecting from the prioritized list the first diagnostic test to run. Next, block 404 depicts selecting the list of prioritized bits that is associated with this selected test. Block 406, then, illustrates running the selected diagnostic test.

The process then passes to block 408 which depicts checking for failures after running the diagnostic test by checking the bits in the FIRs in the order of priority as indicated by the selected list that is associated with the selected test. Thus, after a particular diagnostic test is run, the first group of bits, that were designed to be used to report this test's results, as well as the second group of bits, that were not designed to be used to report this test's results, are all checked. Thereafter, block 410 illustrates a determination of whether or not this is the last test in the prioritized list of tests. If a determination is made that this is not the last test, the process passes to block 412 which illustrates selecting the next diagnostic test to run from the prioritized list of tests. The process then passes back to block 404. Referring again to block 410, if a determination is made that this is the last test, the process terminates as depicted by block 414.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for enhancing the error reporting that is done utilizing fault isolation registers (FIRs) after executing a diagnostic test, said method comprising:

designing a diagnostic test that will test for a particular type of error;

including, in said diagnostic test, a designation of a particular fault isolation register to use to report said particular type of error;

selecting a second fault isolation register that is not designated in said diagnostic test to use to report said particular type of error reporting a result of executing said diagnostic test utilizing said particular fault isolation register and said second fault isolation register, wherein said particular fault isolation register and said second fault isolation register are used to determine said result;

including, in said diagnostic test, a designation of a first group of bits to use to report said particular type of error;

selecting a second group of bits that is not designated in said diagnostic test to be used to report said particular type of error;

reporting said result utilizing said first and second groups of bits;

prioritizing all bits from said first and second groups by creating a list of said bits in a particular order;

determining said result of executing said diagnostic test by checking each bit in said list in said particular order;

prioritizing said bits by creating said list of said bits in order of seriousness of fault;

listing one of said bits that indicates a most serious fault first;

storing said list;

in response to selecting said diagnostic test to be executed, retrieving said list;

determining said result of executing said diagnostic test utilizing said retrieved list;

designing a plurality of diagnostic tests;

prioritizing said plurality of diagnostic tests in a particular order giving a higher priority to ones of said plurality of diagnostic tests that test individual hardware components and a lower priority to ones of said plurality of diagnostic tests that test combinations of multiple hardware components;

executing said plurality of diagnostic tests in said particular order wherein said ones of said plurality of diagnostic tests that test individual hardware components are executed first and said ones of said plurality of diagnostic tests that test said combinations of multiple hardware components are executed last.

2. The method according to claim 1, further comprising:
determining said result of executing said diagnostic test by checking said particular fault isolation register and said second fault isolation register.

3. An apparatus in a data processing system for enhancing the error reporting that is done utilizing fault isolation registers (FIRs) after executing a diagnostic test, said apparatus comprising:

a diagnostic test that is designed to test for a particular type of error;

a designation, included in said diagnostic test, of a particular fault isolation register to use to report said particular type of error;

said diagnostic test not including a designation of a second fault isolation register to use to report said particular type of error reporting means for reporting a result of executing said diagnostic test using said particular fault isolation register and said second fault isolation register, wherein said particular fault isolation register and said second fault isolation register are used to determine said result said diagnostic test including a designation of a first group of bits to be used to report said particular type of error;

said diagnostic test not including a designation of a second group of bits;

said first and second of bits utilized to report said result of said test;

all bits from said first and second groups being prioritizing by creating a list of said bits in a particular order;

said result of executing said diagnostic test determined by checking each bit in said list in said particular order;

said bits being prioritized by creating said list of said bits in order of seriousness of fault;

one of said bits that indicates a most serious fault being listed first;

said list stored within said system;

in response to selecting said diagnostic test to be executed, said list being retrieved;

said retrieved list for determining said result of executing said diagnostic test;

a plurality of diagnostic tests;

said plurality of diagnostic tests being prioritized in a particular order giving a higher priority to ones of said plurality of diagnostic tests that test individual hardware components and a lower priority to ones of said plurality of diagnostic tests that test combinations of multiple hardware components; and said system executing said plurality of diagnostic tests in said particular order wherein said ones of said plurality of diagnostic tests that test individual hardware components are executed first and ones of said plurality of diagnostic tests that test said combinations of multiple hardware components are executed last.

4. The apparatus according to claim 3, further comprising:
said result of executing said diagnostic test determined by checking said particular fault isolation register and said second fault isolation register.

5. A computer program product that is stored in a computer storage readable medium for enhancing the error reporting that is done utilizing fault isolation registers (FIRs) after executing a diagnostic test, said product comprising:

instructions for designing a diagnostic test that will test for a particular type of error;

instructions for including, in said diagnostic test, a designation of a particular fault isolation register to use to report said particular type of error;

instructions for selecting a second fault isolation register that is not designated in said diagnostic test to use to report said particular type of error;

instructions for reporting a result of said diagnostic test utilizing said particular fault isolation register and said second fault isolation register, wherein said particular fault isolation register and said second fault isolation register are uses to determine said result;

instructions for including, in said diagnostic test, a designation of a first group of bits to use to report said particular type of error;
instructions for selecting a second group of bits that is not designated in said diagnostic test to be used to report said particular type of error;
instructions for reporting said result utilizing said first and second groups of bits;
instructions for prioritizing all bits from said first and second groups by creating a list of said bits in a particular order;
instructions for determining said result of executing said diagnostic test by checking each bit in said list in said particular order;
instructions for prioritizing said bits by creating said list of said bits in order of seriousness of fault;
instructions for listing one of said bits that indicates a most serious fault first;
instructions for designing a plurality of diagnostic tests;
instructions for prioritizing said plurality of diagnostic tests in a particular order giving a higher priority to ones of said plurality of diagnostic tests that test individual hardware components and a lower priority to ones of said plurality of diagnostic tests that test combinations of multiple hardware components; and
instructions for executing said plurality of diagnostic tests in said particular order wherein said ones of said plurality of diagnostic tests that test individual hardware components are executed first and ones of said plurality of diagnostic tests that test combinations of multiple hardware components are executed last.

6. The product according to claim 5, further comprising:
instructions for determining said result of executing said diagnostic test by checking said particular fault isolation register and said second fault isolation register.

* * * * *